(12) United States Patent
Bassmann et al.

(10) Patent No.: US 8,752,583 B2
(45) Date of Patent: Jun. 17, 2014

(54) MULTI-WAY VALVE OF A FUEL SYSTEM OF A GAS TURBINE

(75) Inventors: Carsten Bassmann, Neuss (DE); Horst Uwe Rauh, Essen (DE); Ulrich Wagner, Engelskirchen (DE)

(73) Assignee: Siemens Aktiengesellschaft, Munich (DE)

( * ) Notice: Subject to any disclaimer, the term of this patent is extended or adjusted under 35 U.S.C. 154(b) by 737 days.

(21) Appl. No.: 12/996,862

(22) PCT Filed: May 19, 2009

(86) PCT No.: PCT/EP2009/056073
§ 371 (c)(1),
(2), (4) Date: Mar. 2, 2011

(87) PCT Pub. No.: WO2009/150013
PCT Pub. Date: Dec. 17, 2009

(65) Prior Publication Data
US 2011/0139281 A1 Jun. 16, 2011

(30) Foreign Application Priority Data

Jun. 9, 2008 (DE) .......... 10 2008 027 410
Jun. 27, 2008 (DE) .......... 10 2008 030 167

(51) Int. Cl.
*F16K 11/085* (2006.01)
*F02C 7/232* (2006.01)

(52) U.S. Cl.
USPC .................... 137/625.23; 137/625.47

(58) Field of Classification Search
CPC . F16K 11/07; F16K 11/0716; F16K 11/0853; F16K 11/0856; F15B 13/0406
USPC .................... 137/625.22, 625.23, 625.47
See application file for complete search history.

(56) References Cited

U.S. PATENT DOCUMENTS

| | | | | | |
|---|---|---|---|---|---|
| 1,344,490 | A | * | 6/1920 | Downie | 137/625.23 |
| 1,593,795 | A | * | 7/1926 | Cossette | 137/625.23 |
| 1,609,015 | A | * | 11/1926 | Engbrecht | 137/625.47 |
| 2,051,401 | A | * | 8/1936 | Winterstein | 137/625.47 |
| 2,374,714 | A | * | 5/1945 | Turchan et al. | 137/625.23 |
| 2,557,586 | A | * | 6/1951 | Anderson et al. | 137/625.23 |
| 2,960,073 | A | * | 11/1960 | Roxburgh | 137/625.23 |
| 3,022,738 | A | * | 2/1962 | Krute | 137/625.23 |
| 3,610,283 | A | * | 10/1971 | Hill et al. | 137/625.23 |
| 3,927,693 | A | * | 12/1975 | Johnston | 137/625.47 |
| 5,090,194 | A | | 2/1992 | Richards et al. | |
| 5,131,431 | A | * | 7/1992 | Vullmahn | 137/625.23 |
| 6,216,736 | B1 | * | 4/2001 | Benedetti | 137/625.47 |
| 6,470,913 | B1 | * | 10/2002 | Woodworth | 137/625.23 |
| 2003/0233823 | A1 | | 12/2003 | Futa, Jr. et al. | |
| 2004/0173510 | A1 | | 9/2004 | Jung | |

FOREIGN PATENT DOCUMENTS

| | | |
|---|---|---|
| CN | 2830828 Y | 10/2006 |
| DE | 460 190 C | 5/1928 |
| DE | 596 026 C | 4/1934 |

(Continued)

*Primary Examiner* — John Rivell

(57) ABSTRACT

A multi-way valve of a fuel system of a gas turbine is provided. The multi-way valve includes a valve body provided with a cylindrical housing, the wall bounding the housing includes a plurality of openings for supplying and/or removing fluids, wherein a movably supported insert including at least one channel having two additional openings is provided in the housing, whereby two adjoining openings may be fluidically connected to each other.

5 Claims, 6 Drawing Sheets

(56) References Cited

FOREIGN PATENT DOCUMENTS

| | | | |
|---|---|---|---|
| DE | 1 209 382 | B | 1/1966 |
| EP | 0 240 059 | A1 | 10/1987 |
| JP | 54079520 | A | 6/1979 |
| JP | 63285375 | A | 11/1988 |
| JP | 1267323 | A | 10/1989 |
| JP | 9225028 | A | 9/1997 |
| RU | 2027936 | C1 | 1/1995 |
| RU | 1839525 | | 4/1996 |
| SU | 66393 | A | 5/1979 |
| SU | 1116257 | A1 | 9/1984 |

\* cited by examiner

|  | way | position |
|---|---|---|
| path A | A-B | S3 |
| path B | C-D | S3 |
| path D | C-B; D-E | S2 |
| path E | A-E | S1 |

MULTI-WAY VALVE OF A FUEL SYSTEM OF A GAS TURBINE

This application is the US National Stage of International Application No. PCT/EP2009/056073, filed May 19, 2009 and claims the benefit thereof. The International Application claims the benefits of German applications No. 10 2008 027 410.0 DE filed Jun. 9, 2008 and No. 10 2008 030 167.1 filed Jun. 27, 2008. All of the applications are incorporated by reference herein in their entirety.

FIELD OF INVENTION

The invention refers to a multi-way valve of a fuel system of a gas turbine. Furthermore, the invention refers to a fuel system of a gas turbine with a multi-way valve of this type.

BACKGROUND OF INVENTION

In known fuel systems of gas turbines, a so-called "multi-function valve" (MFV) (see FIG. 1) exists for their oil or fuel supply. This MFV comprises a plurality of valves in order to be able to switch over between an oil supply source, a nozzle and a drain line of the fuel system. During the switchover, the valves between the respective pipelines 1 . . . n are controlled at the same time via an actuator in each case.

In this case, the pipelines, particularly in the form of burner connecting lines for diesel oil and water, have to be switched in a way that different operating modes such as diesel-oil operation, emulsion operation and also flushing and draining processes can be carried out.

There is also an actuator in order to control a plurality of like valves for the source ($Q_1$-$Q_n$), drain line ($S_1$-$S_n$) and nozzle ($N_1$-$N_n$) at the same time. These actuators are as a rule electrohydraulic. Therefore, for example "n" valves are moved in the source line by means of one actuator. Consequently, at least three actuators are required.

In addition to the closing of all the valves, the following flow connections are possible:
Source+drain line (valve in nozzle line closed),
Source+nozzle (valve in drain line closed) and
Drain line+nozzle (valve in source line closed).

Known multi-way valves are still comparatively expensive and prone to malfunction.

SUMMARY OF INVENTION

It is an object of the invention to create a fuel system of a gas turbine, in which the aforementioned disadvantages are overcome and in particular, a reliable and simple remote operation of the switching processes of the associated valves is possible. Furthermore, new interconnecting possibilities for new gas turbine types are to be created.

The object is achieved with a fuel system of a gas turbine with a multi-way valve according to the invention.

According to the invention, a multi-way valve of a fuel system of a gas turbine is created, in which multi-way valve provision is made for a valve body which is provided with a cylindrical housing, a plurality of ports for the feed and/or drain of fluids being arranged in the wall of the valve body which delimits the housing, wherein provision is made in the housing for a movably supported insert with at least one passage with two additional ports by means of which two adjacent ports can be fluidically interconnected.

In a first advantageous development of the solution according to the invention, the ports are arranged lying in one plane perpendicularly to the center axis of the housing, and the insert is formed corresponding to the housing and is supported in the housing in a manner in which it can rotate around its center axis. The rotatable insert forms a control element which is simple to operate.

In a second advantageous development of the solution according to the invention, "m" is the number of ports along a circumference along the wall. The insert has a passage, the additional ports of which are arranged in an offset manner to each other by an angle $\alpha$ along its circumference, $\alpha=360°/m$ being applicable to the angle $\alpha$. In this way, a plurality of switching positions which are distributed on the circumference can be realized.

In a third advantageous development of the solution according to the invention, four ports are distributed uniformly along the circumference of the cylindrical housing and the additional ports of the passage which is arranged in the insert are arranged along the circumference at an angle to each other, which is equal to 90°. This configuration, with adequate switching distance, at the same time offers an adequately large number of switching positions.

In a fourth advantageous development of the solution according to the invention, the housing, at at least two axial positions, has in each case a plurality of ports which lie in one plane, and the insert, at a distance which corresponds to the spacing of the planes, has at least one passage for each plane in order to fluidically interconnect the ports which lie inside one of the planes. Thus, a plurality of valves which are to be operated at the same time can be formed and operated with only one switching element.

In a fifth advantageous development of the solution according to the invention, the ports which lie in one plane are interconnected outside the housing, preferably by means of a bridge which is arranged in the valve body. The bridge enables additional switching possibilities in a simple manner.

In a sixth advantageous development of the solution according to the invention, which at the same time can represent an independent solution as such, the multi-way valve is configured as a 2/3 directional valve and a 3/3 directional valve operationally connected to it. The switching arrangement of this type consisting of the two stated directional valves surprisingly fulfills all the necessary switching functions and at the same time is especially simple, inexpensive and operationally reliable to operate in the process.

In a final advantageous development of the solution according to the invention, a plurality of disk pairs, which are associated in each case with a burner, are arranged in series. In this way, a large number of passages or burners of a gas turbine can be supplied as desired. The disks can be easily operated together by them being rotationally-fixedly arranged on a shaft.

BRIEF DESCRIPTION OF THE DRAWINGS

An exemplary embodiment of the solution according to the invention is subsequently explained in more detail with reference to the attached schematic drawings.

In the drawing.

DETAILED DESCRIPTION OF INVENTION

Figure 1:
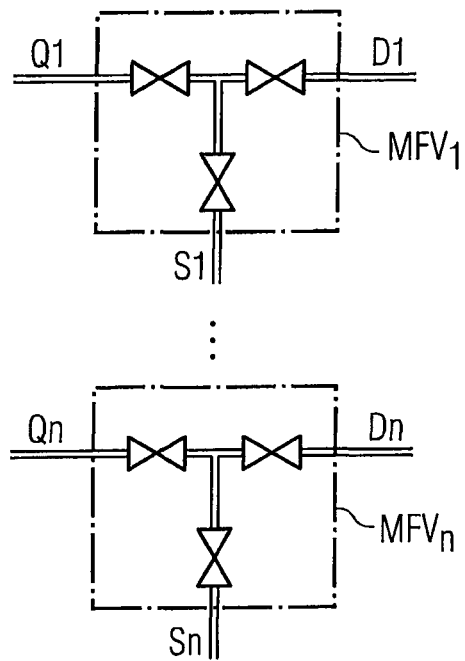
FIG. 1 shows a schematic diagram of an MFV according to the prior art.
Figure 2:
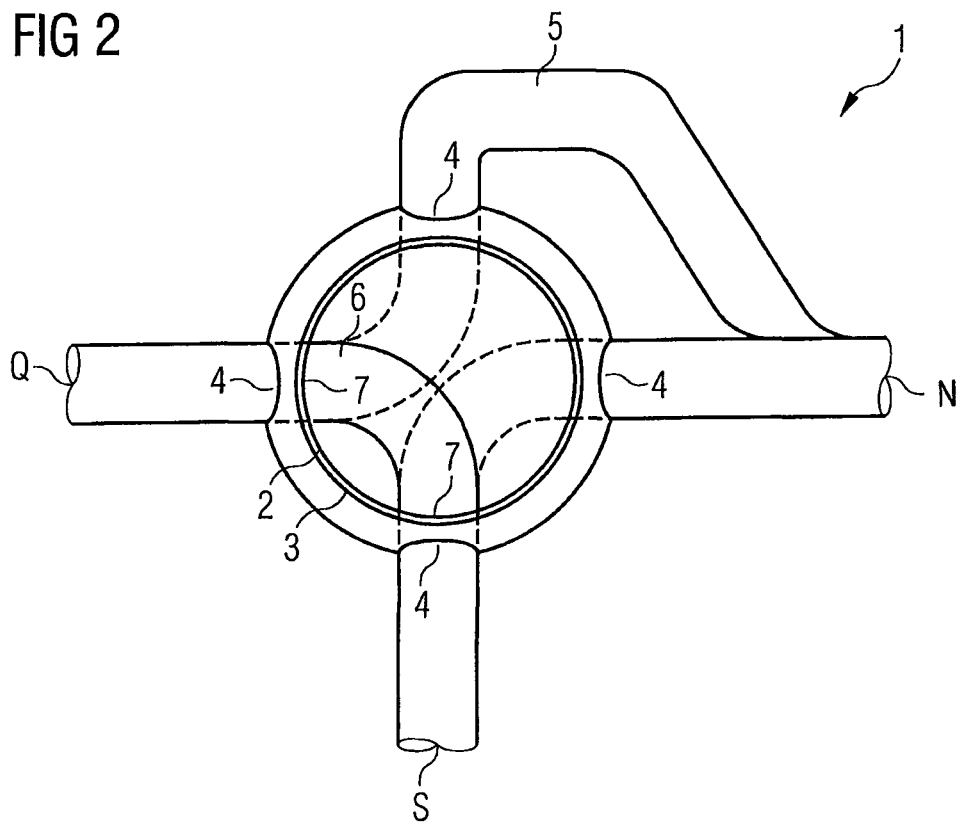
FIG. 2 shows a plan view of a first exemplary embodiment of a multi-way valve according to the invention.
Figure 3:
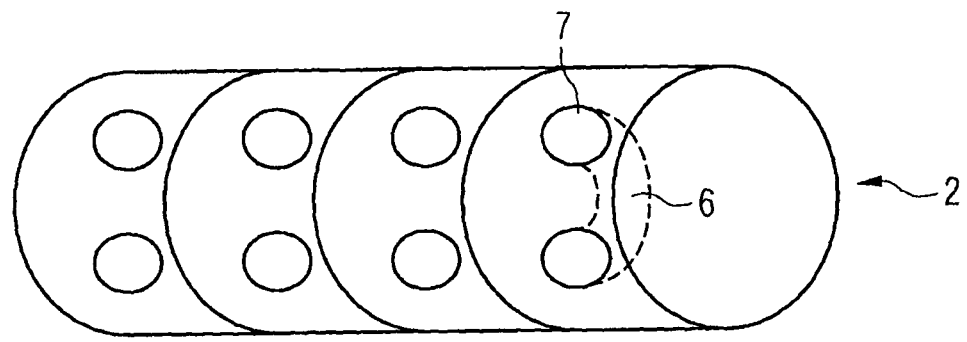
FIG. 3 shows a perspective view of an insert of the multi-way valve according to FIG. 2.
Figure 4:
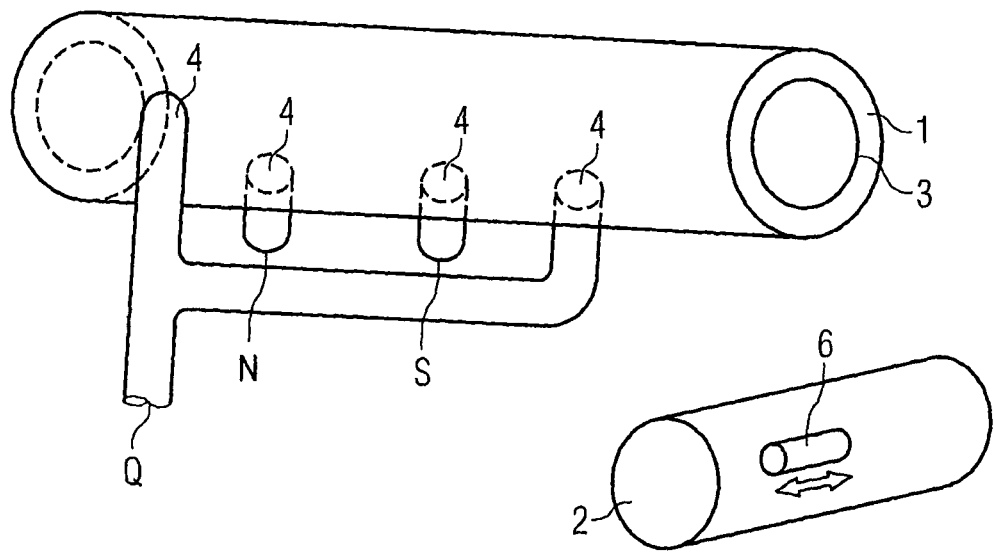
FIG. 4 shows a perspective view of a second exemplary embodiment of a multi-way valve according to the invention with its housing and insert.

In the exemplary embodiment which is shown in FIGS. 2 to 4, the previously individual valves of an MFV according to the prior art (compare FIG. 1) are replaced by a multi-way valve or a device 1 with which by rotating or displacing an insert 2 which is installed therein, a switchover between different inlets and outlets can be carried out.

Thus, in the exemplary embodiment which is shown, a bore as a cylindrical housing 3 is provided in a valve body. In the wall which delimits the housing 3, four ports 4, which are offset by 90° in each case and lie in one plane perpendicularly to the center axis of the housing 3, are formed as inlets or outlets.

They are therefore uniformly distributed along the circumference. Two of the ports 4 are fluidically interconnected outside the housing 3 by means of an external bridge 5. The cylindrical valve cylinder or insert 2 is arranged in the housing 3 in a manner in which it can rotate around its center axis and is formed to fit accurately in the housing 3. The insert 2 has a curved passage 6, the ports of which as so-called additional ports 7 are arranged on the circumference at an angle of 90° to each other.

The first of the ports 4 can be connected for example to a source Q, for example for fuel, the second of the ports is connected to the drain line S, and the third and fourth of the ports 4 are connected via the bridge 5 to a nozzle N of a gas-turbine burner.

In the position of the passage 6 which is represented by a solid line, the source is connected to the drain line. By rotating the insert 2 by an angle of 90° anticlockwise, the passage 6 is brought into the position shown by a dashed line, as a result of which the drain line S and nozzle N are interconnected.

If, however, the insert 2 is rotated clockwise by 90°—starting from the position shown by a solid line —, then the source Q is connected via the passage 6 which is arranged in the insert 2 and by means of the bridge 5 to the nozzle N.

In order for a plurality of fuel lines of different fuel stages and/or different burners to achieve a synchronous switchover, a plurality of the previously described valves are distributed in the valve body 1 along the center axis of the housing 3 (compare the associated insert according to FIG. 3). Therefore, at least two, preferably n—with "n" being the number of fuel lines—times four ports 4, which lie in one plane in each case, are provided for connection of the respective line: source Q, drain line S, bridge 5 and nozzle N. The associated insert 2, as shown perspectively in FIG. 3, also has staggered passages 6 for connecting the respective ports 4 which lie in one of the planes.

In a further exemplary embodiment, which is not shown, instead of four ports 4 arranged in one plane, there are only three ports 4 which are distributed uniformly along the circumference. In this case, the additional ports 7 of the passage 6 which is arranged in the insert 2 are offset by 120° (=360°/the number of ports in a plane, in this case=3).

In the exemplary embodiment which is shown in FIG. 4, the individual connections or ports 4 for source Q, drain line S and nozzle N are not distributed along the circumference of the housing 3 or bore, but distributed equidistantly in the axial direction of the bore. For this case, provision is made in the cylindrical surface of the insert 2 for slots 6, which extend in the axial direction, with an axial length which enables the connecting of two directly axially adjacent ports 4. As a result of an axial displacement of the insert 2, adjacent ports 4 can then be interconnected. For n fuel lines, these are then to be arranged in an axially staggered manner. This, however, possibly leads to a longer axial overall length of the multi-way valve 1.

As a result of the above-described arrangement, all the valve positions can be achieved by one actuator. By the same token, one valve does not have to be installed for each way, but a rotational and/or displacement device suffices for movement of the insert for a plurality of valves. Therefore, the construction is more cost-effective and more space-saving. Furthermore, the described unit can be variably configured by means of other inserts if, for example, a plurality of inlet and outlets are to be interconnected.

Figure 5:
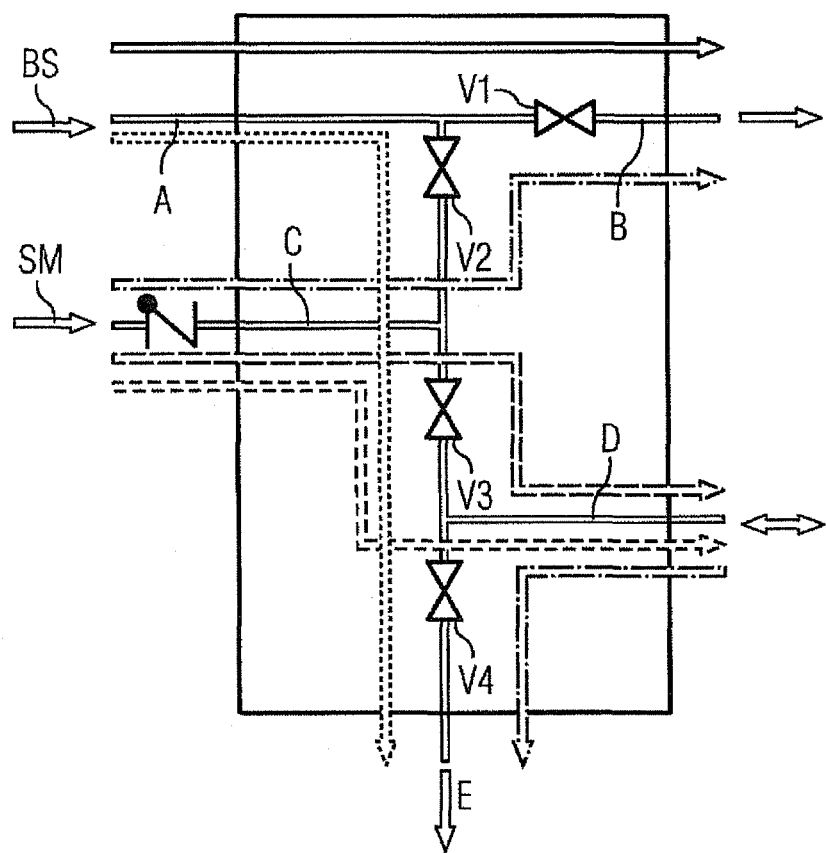
FIG. 5 shows a diagram of the switching principle of a fuel system to be realized according to the invention of a gas turbine.

In FIG. 5, the switching principle of a further fuel system of a gas turbine is shown, in which by means of a line A fuel BS is delivered to a line B (leading to a burner which is not shown) (way A–B=path A). In this case, a (then open) shut-off valve V1 is in the line. A line in which a second (then closed) shut-off valve V2 is located, branches from the line A upstream of the shut-off valve V1 in the flow direction. Running into this line, downstream of the shut-off valve V2 in the flow direction, is a line C into which a flushing medium SM can be fed. In the line C, moreover, a check valve is located. A third shut-off valve V3 enables the flushing medium to be channeled through to a line D (way C--=path B, C), a fourth valve V4 shutting off a drainage line or discharge line E.

Furthermore, the line B can be flushed with flushing fluid SM through the valves V2 and V1 (way C–B=path D), while at the same time the valve V4 opens the drain line E and the valve V3 prevents flushing fluid SM backflowing into the line C (way D–E=path D).

Figure 6:
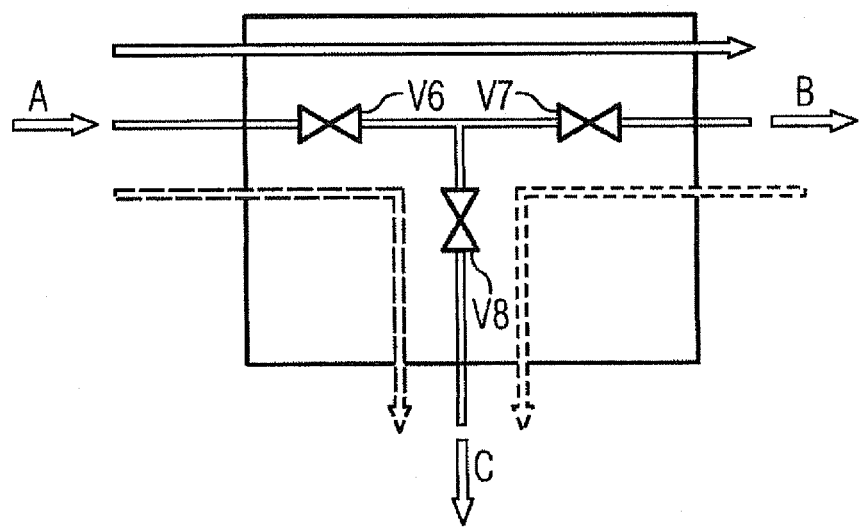
FIG. 6 shows a diagram of the switching principle of a 3/3 directional valve.
Figure 7:
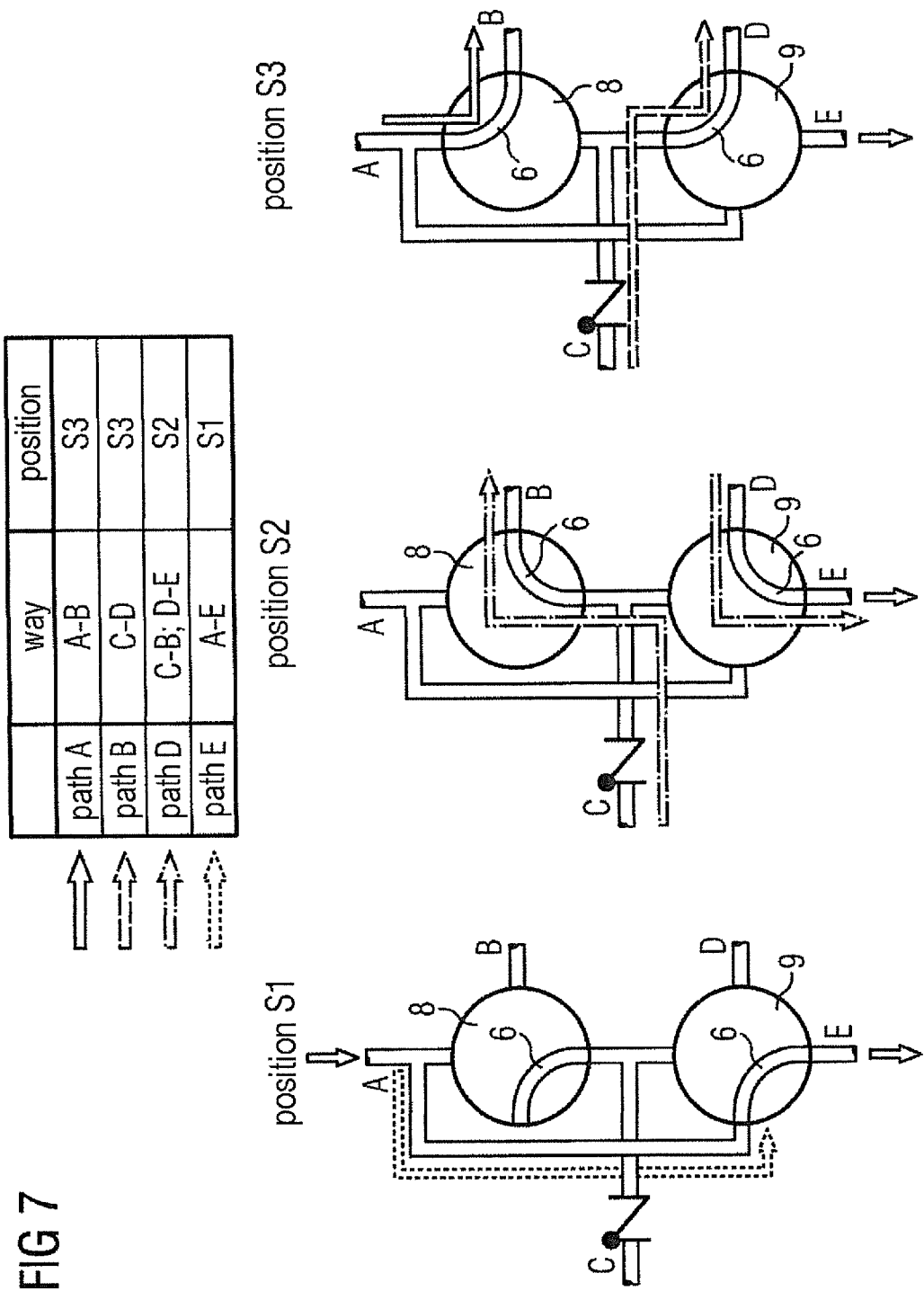
FIG. 7 shows a schematic diagram of the switching arrangement according to the invention with a 3/3 directional valve and a 4/3 directional valve.
Figure 8:
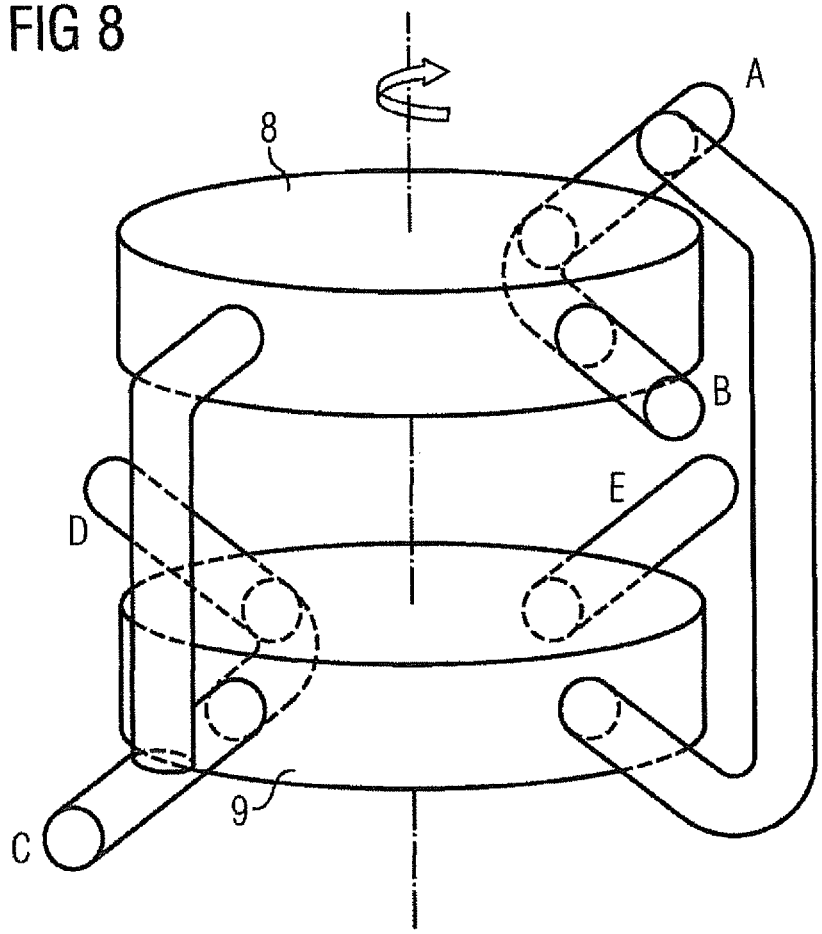
FIG. 8 shows a perspective view of an exemplary embodiment of a multi-way valve according to the switching arrangement of FIG. 7.

All the switching functions in the exemplary embodiment which is shown in FIGS. 7 and 8 are realized by means of a combination of a 3/3 directional valve and a 4/3 directional valve which is connected to this at the same time. FIG. 6 shows in this case the basic construction of a 3/3 directional valve which is used.

As is to be seen in FIG. 7, the multi-way valve which is shown there comprises an insert 2 with two disks, specially the disks 8 and 9, in which a passage 6 is located in each case (corresponding to FIGS. 2 to 4). The housing 3 which encloses the disks 8 and 9 contains associated ports so that the disk 8 acts as a 3/3 directional valve and the disk 9 acts as a 4/3 directional valve forming a 5/3 directional valve. The switching positions S1 to S3 which are occupied in each case in the process are to be gathered from the three sub-figures. In FIG. 8, the entire 5 arrangement according to FIG. 7 is schematically shown in perspective view. In this case, it is to be seen that for realizing the switching arrangement the leads to the first disk 8 and the lines D and E alone lead to the second disk 9. FIG. 8 shows the position S3, wherein the position S2 is occupied by the two rotationally-fixedly interconnected disks 8 and 9 being rotated to the right by 90°, and the position S1 is occupied by rotation to the right by a further 90°.

The invention claimed is:

1. A multi-way valve of a fuel system of a gas turbine, comprising:
a valve body provided with a cylindrical housing; and
a plurality of ports for the feed and/or drain of fluids arranged in a wall of the valve body which delimits the housing,
wherein provision is made in the housing for a movably supported insert including a passage with two additional ports by means of which two adjacent ports may be fluidically interconnected,
wherein the plurality of ports are arranged lying in a first plane perpendicularly to first center axis of the housing and in which the insert is formed corresponding to the housing and is supported in the housing in a manner in which the insert may rotate around a second center axis of the insert,
wherein the housing, at at least two axial positions, includes in each case the plurality of ports which lie in aone plane, and the insert, at a distance which corresponds to a spacing of the planes, includes the passage for each plane in order to fluidically interconnect the plurality of ports which lie inside one of the planes,
wherein provision is made for two bridges which are arranged in the valve body and which in each case interconnect the plurality of ports which are arranged in different planes,
wherein "m" is a number of the plurality of ports along a circumference along the wall where the insert includes the passage,
wherein a plurality of additional s sorts of the passage are arranged in an offset manner to each other by an angle α along the circumference, and
wherein α=360°/m.

2. A fuel system of a gas turbine, comprising:
a multi-way valve, comprising:
a valve body provided with a cylindrical housing, and
a plurality of ports for the feed and/or drain of fluids arranged in a wall of the valve body which delimits the housing,
wherein provision is made in the housing for a movably supported insert including a passage with two additional ports by means of which two adjacent ports may be fluidically interconnected,
wherein the plurality of ports are arranged lying in a first plane perpendicularly to first center axis of the housing and in which the insert is formed corresponding to the housing and is supported in the housing in a manner in which the insert may rotate around a second center axis,
wherein the housing, at at least two axial positions, includes in each case the plurality of ports which lie in one plane, and the insert, at a distance which corresponds to a spacing of the planes, includes the passage for each plane in order to fluidically interconnect the plurality of ports which lie inside one of the planes, and
wherein provision is made for two bridges which are arranged in the valve body and which in each case interconnect the plurality of ports which are arranged in different planes, and
wherein one plane of the multi-way valve is configured as a 3/3 directional valve and the other plane of the mutli-way valve is configured as a 4/3 directional valve for forming a 5/3 directional valve.

3. The fuel system as claimed in claim 2, wherein a plurality of disk pairs, which are associated in each case with a burner, are arranged in series,
wherein which the two directional valves are configured in such a way that in each operating mode of the fuel system they have the same associated operating positions,
wherein which the two directional valves are configured as two functional disks of an insert, or of the insert, which is rotatable in an associated housing, which disks are arranged in series in the direction of the center axis of the insert.

4. A gas turbine comprising: a fuel system according to claim 2.

5. The gas turbine as claimed in claim 4,
wherein which the two directional valves are configured in such a way that in each operating mode of the fuel system they have the same associated operating positions,
wherein which the two directional valves are configured as two functional disks of an insert, or of the insert, which is rotatable in an associated housing, which disks are arranged in series in the direction of the center axis of the insert, and
wherein a plurality of disk pairs, which are associated in each case with a burner, are arranged in series.

* * * * *